United States Patent [19]

Bodine

[11] Patent Number: 4,815,328

[45] Date of Patent: Mar. 28, 1989

[54] ROLLER TYPE ORBITING MASS OSCILLATOR WITH LOW FLUID DRAG

[76] Inventor: Albert G. Bodine, 7877 Woodley Ave., Van Nuys, Calif. 91406

[21] Appl. No.: 44,662

[22] Filed: May 1, 1987

[51] Int. Cl.[4] .............................................. F16H 33/10

[52] U.S. Cl. ........................................ 74/87; 366/128; 366/600

[58] Field of Search .............. 74/87; 175/55; 366/123, 366/128, 600

[56] References Cited

U.S. PATENT DOCUMENTS

| | | | |
|---|---|---|---|
| 1,459,841 | 6/1923 | Mitchell | 366/128 |
| 2,757,544 | 8/1956 | Becker | 74/87 |
| 2,841,995 | 7/1958 | Sieber | 366/128 |
| 2,924,730 | 2/1960 | Spitler | 74/87 |
| 3,166,772 | 1/1965 | Bodine | 74/87 |
| 3,308,671 | 3/1967 | Bodine | 74/87 |
| 3,400,913 | 9/1968 | Matson | 74/87 |
| 3,866,480 | 2/1975 | Elliston | 366/128 |
| 4,424,718 | 1/1984 | Wadensten | 74/87 |

FOREIGN PATENT DOCUMENTS

| | | | |
|---|---|---|---|
| 1043728 | 11/1953 | France | 74/87 |
| 1094450 | 12/1954 | France | 74/87 |

*Primary Examiner*—Lawrence Staab
*Attorney, Agent, or Firm*—Edward A. Sokolski

[57] ABSTRACT

A cylindrical rotor is mounted for rotation in a raceway formed in the inside wall of a housing, the outside diameter of the rotor being only slightly less than the inside diameter of the raceway so that the rotor substantially fills the housing. One or more relatively high mass cylindrical rollers is each contained in a cavity or pocket formed in the outer wall of the rotor, each such roller being free to roll within its pocket and to move radially outwardly by virtue of the centrifugal force generated and to roll around in the raceway with the rotor and roller or rollers filling the housing and riding somewhat closely against the housing wall. This effectively fills all of the space in the housing and prevents the formation of a fluid filled "traveling" space in the housing thereby minimizing roller drag due to fluid turbulence.

6 Claims, 4 Drawing Sheets

ROLLER TYPE ORBITING MASS OSCILLATOR WITH LOW FLUID DRAG

This invention relates to orbiting mass oscillators for use in generating high level vibratory energy at a sonic frequency and more particularly to such a device employing a mass unbalance provided by an orbiting roller.

Orbiting mass oscillators for generating vibratory energy which employ unbalanced rotating force vectors with orbiting rollers which are rotatably driven around the inner race wall of a housing have been employed for some time in generating vibratory energy at a sonic frequency for such purposes as pile driving, earth moving, oil well drilling, etc. Use is often made of a roller type oscillator which generally comprises a heavy cylindrical roller which rolls precessionally in a cycloidal fashion about the inside surface of a cylindrical housing. This is particularly suitable in high power applications in that this type of roller avoids the need for placing the centrifugal load on ball or roller bearings which are generally utilized to support swinging weight oscillators. Orbiting mass oscillators employing roller type excitation masses are described in my U.S. Pat. Nos. 3,291,227, 3,217,551 and 3,299,722. These prior art devices generally employ a unitary roller member which is driven in its orbital path by means of a drive motor through a flexible universal joint linkage or by means of a fluid jet drive which is generally formed by a water or mud stream.

It has been found that with such prior art oscillators, a generally crescent shaped "traveling" space tends to form between the roller and its housing race directly opposite the roller. This is due to the fact that the roller is necessarily smaller than the race surrounding it in order for the roller c.g. to travel in an orbit. While this crescent shaped space may be relatively small with rotors having diameters only moderately less than the inside diameter of the housing, it nevertheless contributes significantly to the drag on the roller particularly in view of the fact that the air and oil vapor mixture in the cavity can form a turbulent torrent which is highly dissipative of energy, especially at higher sonic frequencies, i.e. (high roller speed). This vapor is violently displaced away from the front of the roller and around towards the back thereof.

The device of the present invention operates to substantially eliminate the travelling crescent shaped space which is formed diametrically opposite the roller and thus minimizes the aforementioned roller drag losses encountered in the prior art.

The improvement is achieved in the present invention by employing a roller driving cylindrical rotor which is mounted for concentric rotation in a raceway formed by the inner wall of a cylindrical housing. The cylindrical rotor has a diameter only slightly less than that of the raceway. A single roller member or a plurality of roller members are rotatably contained in one or more cavities or pockets formed along a portion of the outer wall of the main body portion of the rotor. The roller member or members are thus contained so that they are free to rotate orbitally within their respective cavities and in response to the centrifugal force generated by their orbiting motion to move radially outwardly from the main rotor body portion but within the pocket or pockets of the rotor such that the formation of a crescent shaped space between the roller and housing is avoided, thereby minimizing roller drag. The centrifugal force which constrains the roller to its orbit becomes the periodic sonic source.

It is therefore an object of the invention to minimize the drag in roller type orbiting mass oscillators.

It is still a further object of this invention to provide a high power orbiting mass oscillator having higher efficiency than similar prior art devices.

Other objects of the invention will become apparent as the description proceeds in connection with the accompanying drawings of which:

Figure 1:
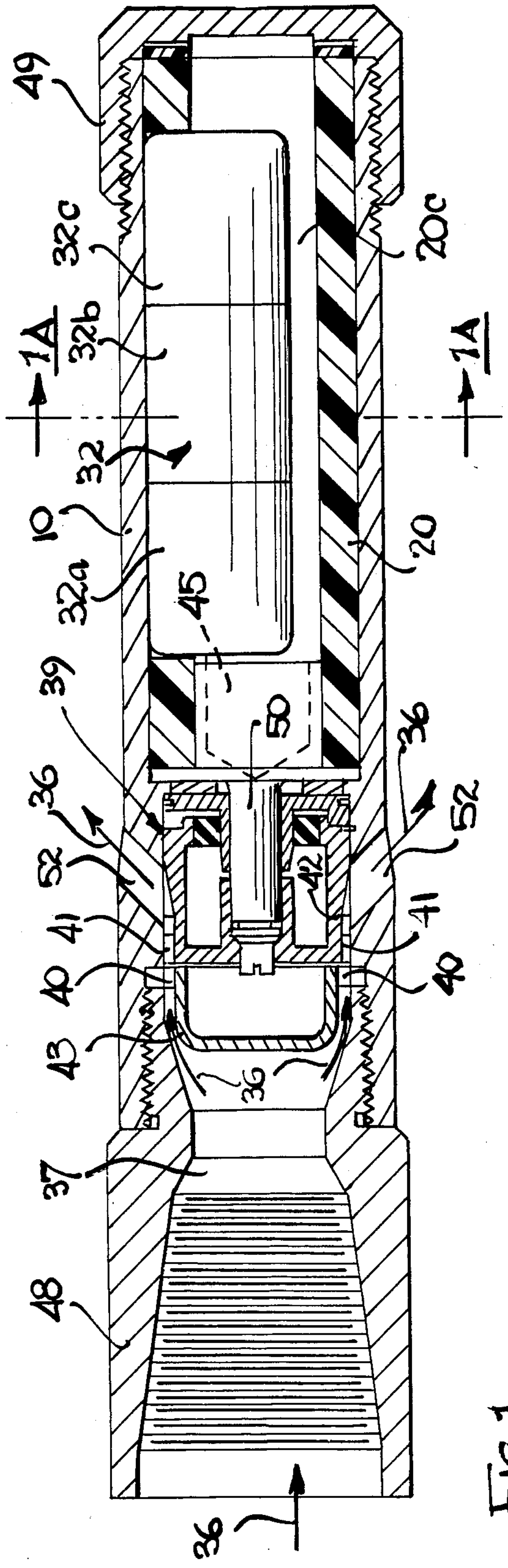
FIG. 1 is a side elevational view in cross section of a first embodiment of the invention.
Figure 1A:
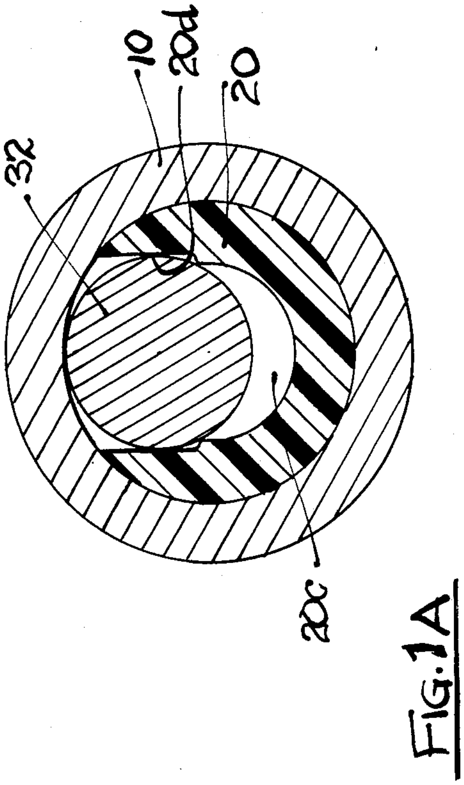
FIG. 1A is a cross sectional view taken along the plane indicated by 1A—1A in FIG. 1.

Referring now to FIGS. 1 and 1A, a first embodiment is illustrated.

Mounted for rotation within housing 10 is a rotor body 20 fabricated of a relatively low mass high strength material such as Micarta. Contained for rotation within cavity or pocket **20*c* formed in rotor 20 is sonic centrifugal roller member 32 which is made up of three similar separate roller sections 32*a*, 32*b* and 32*c* fabricated of a material having a high mass such as steel. Roller 32 is mounted for freedom of centrifugally driven radial motion outwardly from rotor 20 against the inner wall of housing 10 and for freedom of rotation about its longitudinal axis. The smooth side wall 20*d* of pocket 20*c* presses in bearing fashion against roller 32 and thus the roller is propelled in an orbital path. The surface of the inner wall of housing 10 where it abuts against rotor 20 and roller 32 is highly polished to also provide a low bearing friction surface. An end cap 49 is threadably attached to one end of housing 10 to provide a closure for the housing. Cap 48 is threadably attached to the other end of housing 10, this cap having a hollow interior forming a channel 37 for feeding a water or mud stream 36 to the interior of the housing. A turbine 39 is mounted within housing 10 and has a stator 43 fixedly mounted on the housing and a rotor 42 which is mounted for rotation relative to the stator on a sleeve bearing surface formed between the outer wall of the rotor and the inner wall of the casing. The drive shaft 50 of the turbine rotor is coupled to the rotor 20 by means of a pilot extension 45 of the shaft which is press fitted into the rotor. Turbine 39 and along with it main rotor 20 are rotatably driven by means of fluid stream 36 which is fed through nozzles 40 against turbine blades 41 and exhausted through ports 52 formed in housing 10. Roller 32 provides the orbiting mass for the oscillator to enable the generation of vibratory energy as the rotor 20 is rotatably driven causing the centrifugal force generated by the so driven roller 32 to react periodically against housing 10. The formation of a crescent shaped open space between the roller 32 and the housing diametrically opposite is avoided by virtue of the remaining body volume of rotor 20, the rotor filling the available volume inside of housing 10 except for the volume occupied by roller 32**.

Referring now to FIGS. 2A–2E a further embodiment of the invention is illustrated. This embodiment as for the previous embodiment employs a turbine which is not integral to the rotor assembly. Oscillator housing 10 has tool joints 65 and 66 attached to the opposite ends thereof by means of cylindrical collars 60 and studs 67 which have threaded ends and are fitted through the collars and tightened thereagainst by means of nuts 69. The rotor 20 is rotatably mounted in housing 10 on roller bearings 57. As for the previous embodiment, rotor 20 is fabricated of a relatively low mass but stiff material such as Micarta or aluminum. Rollers 32 which are two in number are fabricated of a high mass material such as steel and are freely mounted for receiving circumferential drive and developing rotation within cavities or pockets 20*c* formed within the body of rotor 20. Again, as for the previous embodiments, roller members 32 are free not only to be driven by and to rotate within rotor body 20 but also to move radially outwardly therefrom into forceful engagement with the housing raceway.

The rotor 20 is fixedly attached to the bladed rotor 42 of turbine 39. The bladed stator 43 of the turbine is fixedly mounted in housing 10. A stream 36 which may comprise a mud flow is fed through the hollow center of tool joint 66. This mud flow 36 passes through the apertures in plate 70 and thence through turbine stator blades 40 to drive turbine blades 41. The mud is existed through the oscillator body both through a central passageway 72 formed in the center of the rotor and through an annular passage around the rotor. This design is suited for higher power than those previously described and utilizes a more robust rotor which needs to be carried on roller bearings 57. This device operates in the same manner as the previous embodiments having its housing 10 substantially filled by the rotor 20 to avoid the formation of a crescent shaped space in the portion of the housing diametrically opposite the rollers.

Figure 2A:
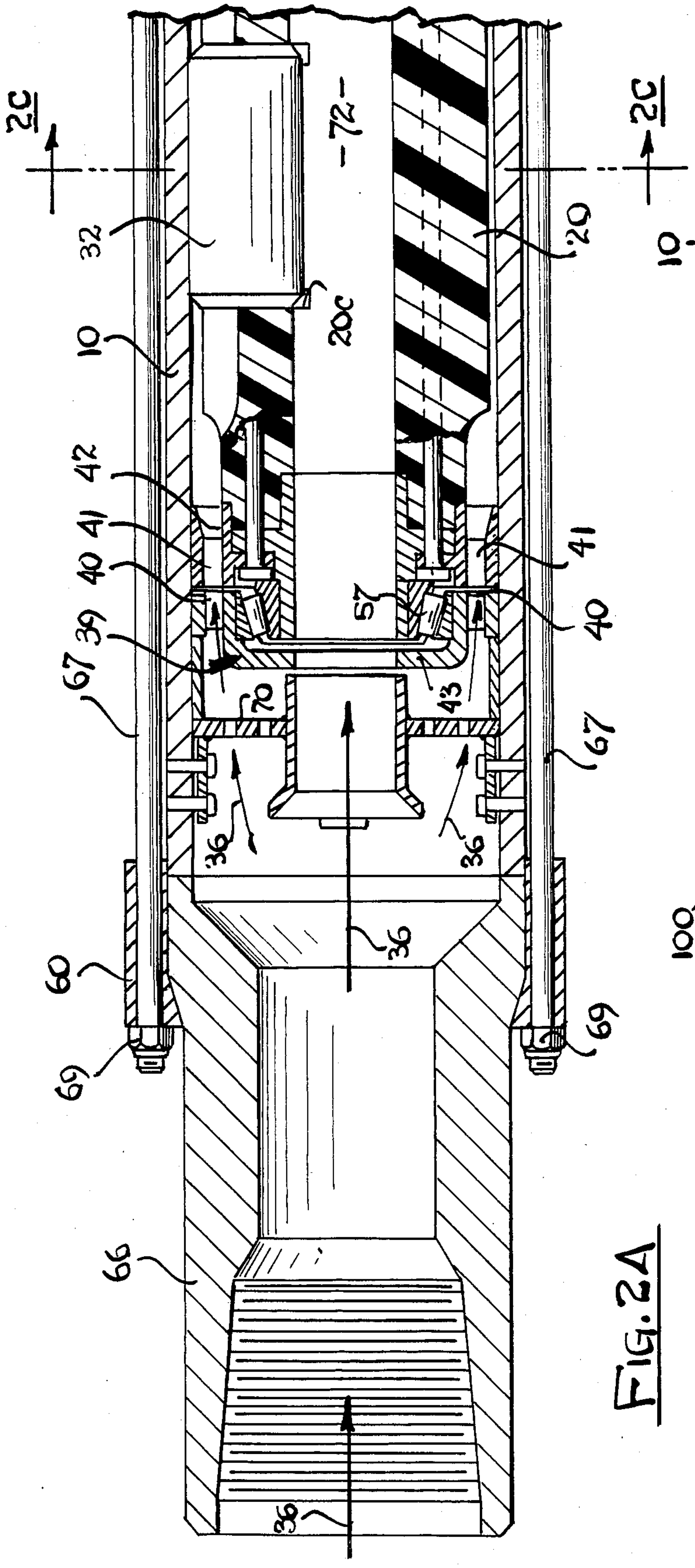
FIGS. 2A and 2B are a side elevational view in cross section of a second embodiment of the invention.
Figure 2E:
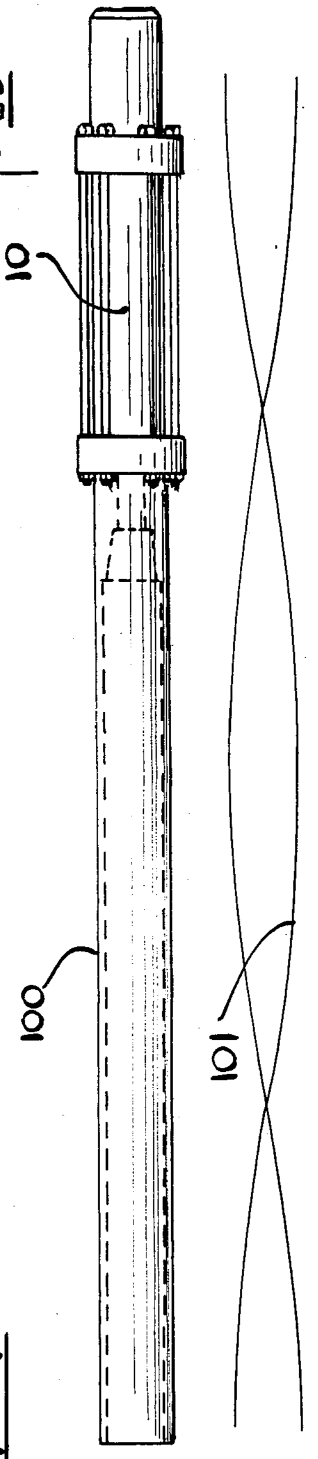
FIG. 2E is a schematic drawing illustrating the generation of a standing wave pattern by the second embodiment of the invention.
Figure 2B:
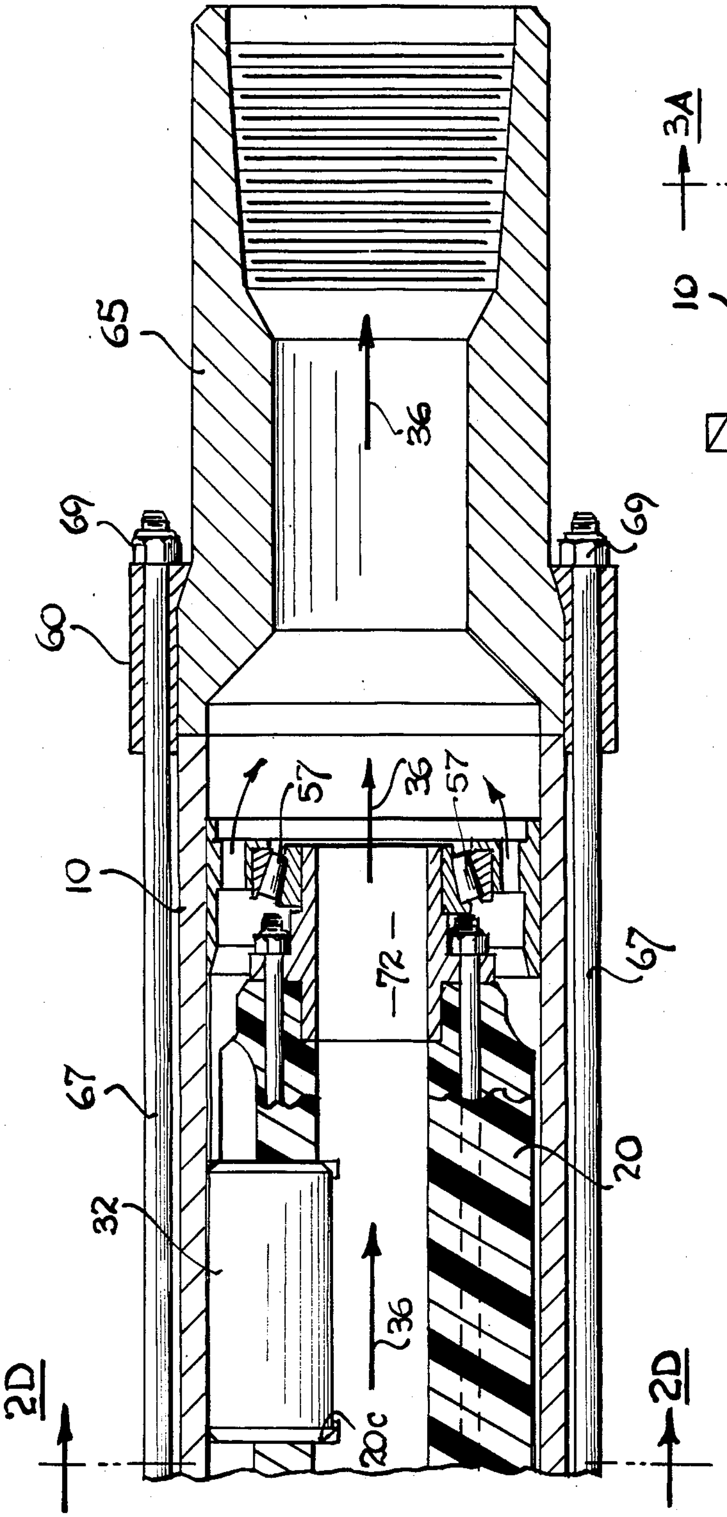

FIG. 2E shows an assembly of the oscillator with a resonant columnar tube 100 providing wave pattern 101. The fluid flow 36 may be adjusted in rate so that the frequency of rollers 32 attain a lateral mode of standing wave resonance as shown by waveform pattern 101. The oscillator of this invention is particularly effective for generating a good standing wave pattern because the drive pockets in the main rotor intimately hold the rollers to close angular position and phase throughout the vibration cycle so as to generate a good clean sinusoidal force output.

All of the above embodiments are sonic oscillators obtaining their periodic force from the centrifugal constraint that holds the orbiting mass roller in its orbit. This constraint is provided by the inner race of the oscillator housing which forces the otherwise free rolling rollers to describe their predetermined periodic curved orbital path. In this case the rollers are driven around their path by the sidewalls of the pockets in the rotor. This rotation of the relatively large stiff structure rotor drives the rollers in a positive and steady manner so as to put out a clean sine wave. This rotor also fills the free space to eliminate dissipative fluid turbulence.

Figure 3A:
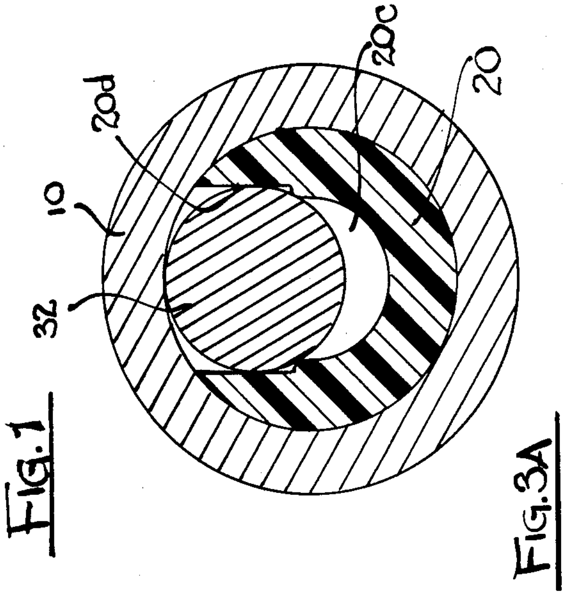
FIG. 3A is a cross sectional view taken along the plane indicated by 3A—3A in FIG. 3.
Figure 3:
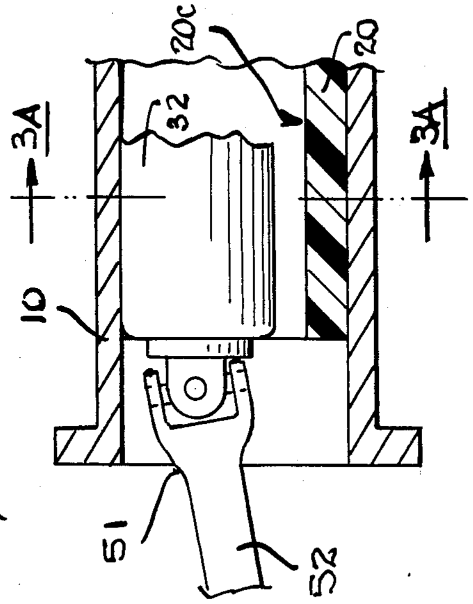
FIG. 3 is a side elevational view in cross section of a third embodiment of the invention.
Figure 2C:
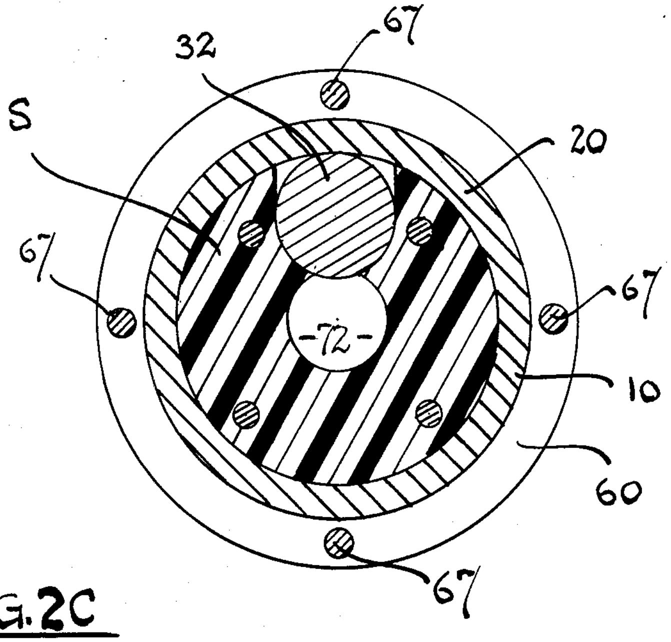
FIG. 2C is a cross sectional view taken along the plane indicated by 2C—2C in FIG. 2A.
Figure 2D:
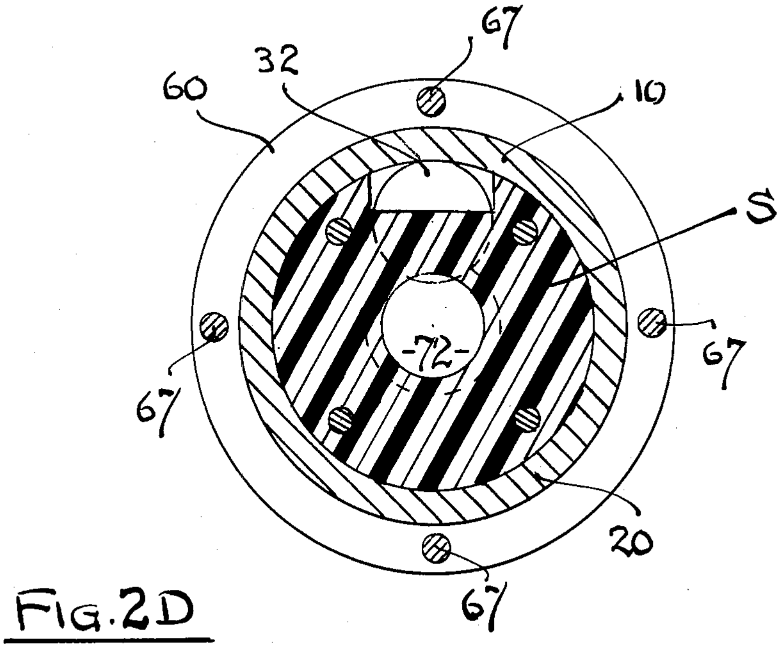
FIG. 2D is a cross sectional view taken along the plane indicated by 2D—2D in FIG. 2B.

It is also possible to implement the invention by driving the roller through a flexible drive shaft coupled to a rotational drive source, the roller operating to rotatably drive the rotor through the bearing pad formed on the wall of the rotor pocket in which it is supported. FIGS. 3 and 3A illustrate an embodiment of the invention with such an implementation which employs structural elements somewhat similar to those of the embodiment of FIG. 1.

Referring to FIGS. 3 and 3A, roller 32 is coupled through universal joint 51 and flexible shaft 52 to a drive motor (not shown). Flexible shaft 52 may be as described in my aforementioned U.S. Pat. No. 3,299,722. As for the embodiment of FIG 1, roller 32 is of a high mass material such as steel and is contained within pocket 20*c* formed within rotor 20 which is of a low mass high strength material such as Micarta. In this embodiment, roller 32 is formed in one piece and is not divided into separate sections as in the embodiment of FIG. 1. As the roller is rotatably driven, it rotatably drives the rotor through the bearing pad 20*d* formed between the roller and rotor. Pocket 20c effectively maintains roller 32 properly aligned parallel to the longitudinal axis of housing 10 despite perturbations in the roller drive. As for the previous embodiments, the rotor and roller fill the open space in the housing to minimize fluid drag.

While the invention has been described and illustrated in detail, it is to be clearly understood that this is intended by way of illustration and example only and is not to be taken by way of limitation, the spirit and scope of the invention being limited only by the terms of the following claims.

I claim:

1. An orbiting mass sonic oscillator comprising:

a cylindrical housing having an inner wall forming a cylindrical raceway, a cylindrical rotor having a diameter slightly less than that of said raceway, said rotor comprising a rigid body having at least one open cavity formed along and breaking through a portion of the outer wall thereof, said outer wall portion being on one side of said rotor diameter, at least one cylindrical roller member contained in said rotor cavity for freedom of rotation and movement radially outwardly from said rotor body, said roller member being of a material having a substantial mass, there being no such roller or open cavity breaking through the outer wall portion of the rotor on the side of said rotor diameter opposite said one side thereof, the open space in said cavity being small as compared with the volume of said roller member, means for rotatably supporting said rotor in said housing for rotation about the longitudinal axis of said raceway, and means for rotatably driving said rotor and roller member in said raceway, said rotor rotating about the longitudinal axis of said housing, said roller member cylically rolling in said cavity and about said raceway in centrifugal engagement therewith so as to generate vibratory energy in said housing by virtue of the mass unbalance provided by the roller member, said roller member and said rotor rotating about said raceway in close engagement therewith such that the formation of a cavity in the portion of said raceway diametrically opposite the roller member is substantially obviated and fluid drag on the rotor minimized.

2. The oscillator of claim 1 wherein the means for rotatably driving the rotor comprises a turbine mounted in said housing, the drive shaft of said turbine being coupled to said rotor, a fluid stream being fed to said turbine to effect rotatable drive thereof.

3. The oscillator of claim 2 wherein the means for rotatably supporting the rotor in the housing comprises roller bearings mounted in said housing.

4. The oscillator of claim 1 wherein the means for rotatably driving said rotor and roller member comprises a flexible drive shaft coupled to said roller member to effect rotation thereof, said roller member rotatably driving the rotor.

5. A mechanical oscillator comprising:

a housing having a circular raceway, a rotor having a solid rotor body supported for rotation around said raceway, said rotor being in internal concentricity with said raceway and substantially filling said raceway radially, said rotor having at least one open cavity formed in and breaking through a portion of the outer wall thereof, said outer wall portion being on one side of a diameter of said rotor, a roller having a high mass, said roller being contained within said pocket for rotation therein and for freedom of movement radially of said rotor, there being no such roller or open cavity breaking through the rotor outer wall portion on the side of said rotor diameter opposite said one side thereof, the open space in said cavity being small as compared with the volume of said roller member, means for rotatably driving said rotor and roller at a sonic frequency such that said roller rolls in an orbital path around said raceway thereby generating sonic energy having a continuously rotating force vector in said housing, the rotor being centrifugally held in close driving engagement with said raceway as it propels said roller in closely held phase relationship therewith, whereby said rotor and roller substantially fill the space within said raceway so as to obviate the formation of fluid turbulence in said raceway.

6. A mechanical sonic oscillator comprising:

a cylindrical housing having an internal circular raceway, a heavy roller having an outside diameter smaller than the inside diameter of said raceway and adapted to roll in an orbital path about the inside of said raceway at a sonic frequency thereby generating a continuously rotating force vector sonic vibration which is delivered to said housing as a source of energy in a sonic elastic wave system, a solid rotor body, bearing means for supporting said rotor body for rotation with predetermined clearance from and concentric with the inside of said raceway, said solid rotor body having a cavity formed in and breaking through an outer wall thereof which is only sufficient in size for containing said roller, the open space in said cavity being small as compared with the volume of said roller, said roller being contained in said cavity, and means for driving said rotor body rotatably, said rotor body being in driving contact with said roller in close engagement in said cavity, the rotation of said rotor body propelling said otherwise freely rolling roller with a closely held angular phase relationship with said sonic elastic wave, the rotor body and roller substantially filling the space between said raceway and the roller and rotor body so that open space turbulence of fluids within said raceway is obviated.

* * * * *